United States Patent
Nedzlek

(10) Patent No.: US 7,699,567 B2
(45) Date of Patent: Apr. 20, 2010

(54) FINAL ADJUSTMENT MECHANISM WITH TACTILE FEEDBACK

(75) Inventor: Kevin Nedzlek, Howell, MI (US)

(73) Assignee: Sandvik, Inc., Fair Lawn, NJ (US)

( * ) Notice: Subject to any disclaimer, the term of this patent is extended or adjusted under 35 U.S.C. 154(b) by 834 days.

(21) Appl. No.: 11/593,615

(22) Filed: Nov. 7, 2006

(65) Prior Publication Data

US 2008/0107493 A1    May 8, 2008

(51) Int. Cl.
B23B 29/034 (2006.01)

(52) U.S. Cl. .......................... 408/158; 82/1.4; 408/1 R; 408/173

(58) Field of Classification Search ................. 408/1 R, 408/153–156, 158–160, 172–173, 180; 82/1.2, 82/1.4; 407/37; B23B 29/00, 29/02, 29/03, B23B 29/034
See application file for complete search history.

(56) References Cited

U.S. PATENT DOCUMENTS

| | | | |
|---|---|---|---|
| 1,734,787 A * | 11/1929 | Appleton | 408/75 |
| 2,223,041 A * | 11/1940 | Maxwell | 408/157 |
| 3,274,861 A * | 9/1966 | Czubak | 408/180 |
| 3,391,585 A * | 7/1968 | Griswold et al. | 82/1.4 |
| 3,499,352 A * | 3/1970 | Milewski et al. | 408/173 |
| 3,530,745 A * | 9/1970 | Milewski | 408/158 |
| 3,625,625 A * | 12/1971 | Van Roojen et al. | 408/158 |
| 3,830,586 A | 8/1974 | Trevarrow | |
| 4,211,510 A | 7/1980 | Hopkins | |
| 4,224,846 A | 9/1980 | Eysel et al. | |
| 4,343,576 A * | 8/1982 | Lagerholm et al. | 408/155 |
| 4,439,074 A | 3/1984 | Kalokhe | |
| 4,451,185 A * | 5/1984 | Yamakage | 408/2 |
| 4,620,281 A | 10/1986 | Thompson et al. | |
| 4,621,548 A * | 11/1986 | Kubo et al. | 82/1.2 |
| 4,679,972 A | 7/1987 | Anderson | |
| 4,893,967 A | 1/1990 | Briese | |
| 4,955,767 A | 9/1990 | Kaiser et al. | |
| 5,222,846 A | 6/1993 | Romi | |
| 5,316,417 A | 5/1994 | Romi | |
| 5,326,198 A | 7/1994 | Romi | |

(Continued)

FOREIGN PATENT DOCUMENTS

DE          3332243 A1 *   3/1985

(Continued)

Primary Examiner—Daniel W Howell
(74) Attorney, Agent, or Firm—Drinker Biddle & Reath LLP

(57) ABSTRACT

Adjustment system for positioning a cutting insert on a cutting tool has a rotatable first rod with a surface having a plurality of flatted areas arranged radially, each at a different radial distance from an axial center of the first rod relative to a sequentially adjacent flatted area, a translatable second rod with an axially tapered surface, wherein a face of the first end of the second rod contacts one of the plurality of flatted areas, a biasing element positioned to exert a force to bias the face of the first end of the second rod to contact the flatted area, and a translatable push pin, wherein a face of the first end of the push pin contacts the tapered surface and wherein a face of the second end of the push pin operatively contacts a cartridge mounted on the cutting tool and in which the cutting insert is seated.

31 Claims, 5 Drawing Sheets

U.S. PATENT DOCUMENTS

| | | |
|---|---|---|
| 5,478,177 A | 12/1995 | Romi |
| 5,709,510 A * | 1/1998 | Scheer .................. 408/156 |
| 5,971,675 A | 10/1999 | Romi |
| 6,293,739 B1 | 9/2001 | Uchino et al. |
| 6,409,435 B1 | 6/2002 | Kocherovsky et al. |
| 6,655,883 B2 * | 12/2003 | Maar .................... 408/158 |
| 6,913,427 B2 | 7/2005 | Erickson et al. |
| 7,029,209 B2 | 4/2006 | Cardemon et al. |

FOREIGN PATENT DOCUMENTS

| | | | |
|---|---|---|---|
| DE | 4022579 A1 | * | 1/1991 |
| DE | 4202149 A1 | * | 7/1993 |
| JP | 54085492 A | * | 7/1979 |
| JP | 11010414 A | * | 1/1999 |
| JP | 2005246527 A | * | 9/2005 |
| JP | 2006263829 A | * | 10/2006 |

* cited by examiner

FINAL ADJUSTMENT MECHANISM WITH TACTILE FEEDBACK

FIELD

The present disclosure relates generally to adjustments on tooling. More particularly, the present disclosure relates to adjustments, for example, fine adjustments, of indexable inserts on tools, typically multiple cartridge and/or insert tools such as boring, milling and turning tools.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Machining tools such as multiple cartridge and/or insert tools for boring, milling and turning, generally have multiple cartridges each mounted onto the tool body by, for example a mounting screw. The alignment of the inserts is important to obtaining proper machining using these tools, which generally must position multiple inserts of the same tool body at the same time. Therefore, the inserts typically have both an adjustment associated with the seating location on the cartridge as well as an adjustment for the cartridge position itself, both axially and radially. The cartridge position adjustment also adjusts the position of the seated insert.

An example of a conventional fine adjustment of indexable inserts on, for example, a boring tool, uses a ground tapered pin 10, known as a Kam screw or eccentric adjustment, to drive a push pin 20 up and deflect a member of the tool, usually a cartridge 30. The cartridge 30 sits in a cavity 40, with positioning aided by a key 50 or other locating device. A finish boring diameter is set by turning a set screw 60 threaded into the cartridge 30 and contacting the push pin 20 to create preload by deformation of the cartridge 30. The tapered pin 10 is seated in a ground hole 70 by a threaded end 80 and has an adjusting surface 90 under the push pin 20. Insert wear adjustments are made by turning the tapered pin 10 to change the position of the push pin 20 toward or away from the cartridge 30. Fine adjustment is measured by aligning a mark on the tapered pin 10 with graduated marks on the body of the tool. The tapered pin 10 is typically orientated to fall directly beneath the cutting point making precise location of all the features of the mechanism critical and difficult to manufacture.

SUMMARY

An adjustment system for positioning a cutting insert on a cutting tool is disclosed. In the disclosed adjustment system, an input motion produces a net translation, e.g. of the cutting surface, that is less than the input motion. In exemplary embodiments, a fine net adjustment that is about 5 to 20% (±10%), alternatively about 10% (±10%), of the input motion is realized. In addition, physical and/or audible feedback to a user occurs during input motion. Exemplary embodiments of the adjustment system has a rotatable first rod with a surface having a plurality of flatted areas arranged radially, each at a different radial distance from an axial center of the first rod relative to a sequentially adjacent flatted area, a translatable second rod with an axially tapered surface, wherein a face of the first end of the second rod contacts one of the plurality of flatted areas, a biasing element positioned to exert a force to bias the face of the first end of the second rod to contact the flatted area, and a translatable push pin, wherein a face of the first end of the push pin contacts the tapered surface and wherein a face of the second end of the push pin operatively contacts a cartridge mounted on the cutting tool and in which the cutting insert is seated. A tool incorporating the adjustment system, a method of radially positioning a cutting surface of a cutting insert on a cutting tool, and a method of adjusting a radial position of a cutting surface of a cutting insert on a cutting tool are also disclosed.

An exemplary adjustment system for positioning a cutting insert on a cutting tool comprises a first rod rotatable about a first axis, the first axis oriented in a first direction, wherein the first rod includes a surface having a plurality of flatted areas arranged radially to the first axis and wherein each of the plurality of flatted areas is at a different radial distance from an axial center of the first rod relative to a sequentially adjacent flatted area, a second rod translatable along a second axis oriented in a second direction, wherein a first end of the second rod has a face that contacts one of the plurality of flatted areas and wherein a surface of the second rod is tapered in the axial direction, a biasing element positioned to exert a force to bias the face of the first end of the second rod to contact the one of the plurality of flatted areas, and a push pin translatable along a third axis oriented in a third direction, wherein a face of the first end of the push pin contacts the tapered surface of the second rod and wherein a face of the second end of the push pin operatively contacts a cartridge mounted on the cutting tool and in which the cutting insert is seated.

An exemplary cutting tool comprises a tool body, a cartridge for one or more cutting inserts, the cartridge mountable in a slot of the tool body with a cutting surface of the one or more cutting inserts projecting beyond a volume of the tool body, and an adjustment system for positioning the cutting insert in a radial direction. The adjustment system includes a first rod located in a first channel of the tool body, the first rod rotatable in the first channel about a first axis, the first axis oriented in a first direction, wherein the first rod includes a surface having a plurality of flatted areas arranged radially to the first axis and wherein each of the plurality of flatted areas is at a different radial distance from an axial center of the first rod relative to a sequentially adjacent flatted area, a second rod located in a second channel of the tool body, a first end of the second channel at least partially intersecting the first channel, the second rod translatable in the second channel along a second axis oriented in a second direction, wherein a first end of the second rod has a face that contacts one of the plurality of flatted areas and wherein a surface of the second rod is tapered in the axial direction, a biasing element located within the interior of the tool body to exert a force to bias the face of the first end of the second rod to contact the one of the plurality of flatted areas, and a push pin located in a third channel of the tool body, a first end of the third channel at least partially intersecting the second channel and a second end of the third channel at least partially intersecting the slot, the push pin translatable in the third channel along a third axis oriented in a third direction, wherein a face of the first end of the push pin contacts the tapered surface of the second rod and wherein a face of the second end of the push pin operatively contacts the mounted cartridge.

An exemplary method of radially positioning a cutting surface of a cutting insert on a cutting tool comprises adjusting an adjustment system for the cutting insert, wherein the adjustment system includes a first rod rotatable about a first axis, the first axis oriented in a first direction, wherein the first rod includes a surface having a plurality of flatted areas arranged radially to the first axis and wherein each of the plurality of flatted areas is at a different radial distance from an axial center of the first rod relative to a sequentially adjacent flatted area, a second rod translatable along a second axis oriented in a second direction, wherein a first end of the second rod has a face that contacts one of the plurality of flatted areas and wherein a surface of the second rod is tapered in the axial direction, a biasing element positioned to exert a force to bias the face of the first end of the second rod to contact the one of the plurality of flatted areas, and a push pin translatable along a third axis oriented in a third direction, wherein a face of the first end of the push pin contacts the tapered surface of the second rod and wherein a face of the second end of the push pin operatively contacts a cartridge mounted on the cutting tool and in which the cutting insert is seated, and wherein adjusting the adjustment system changes the flatted surface contacting the face at the first end of the second rod.

Another exemplary method of adjusting a radial position of a cutting surface of a cutting insert on a cutting tool comprises operating a first rod to place one of a plurality of flatted areas arranged radially to a first axis in contact with a face at a first end of a second rod, wherein the first rod is rotatable about the first axis oriented in a first direction, wherein the second rod is translatable along a second axis oriented in a second direction and wherein a surface of the second rod is tapered in the axial direction, and translating the second rod in the second direction to change a portion of the tapered surface contacting a face of a first end of a push pin, translating the push pin along a third axis oriented in a third direction, wherein a face of a second end of the push pin operatively contacts a cartridge mounted on the cutting tool and in which the cutting insert is seated.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Figure 1:
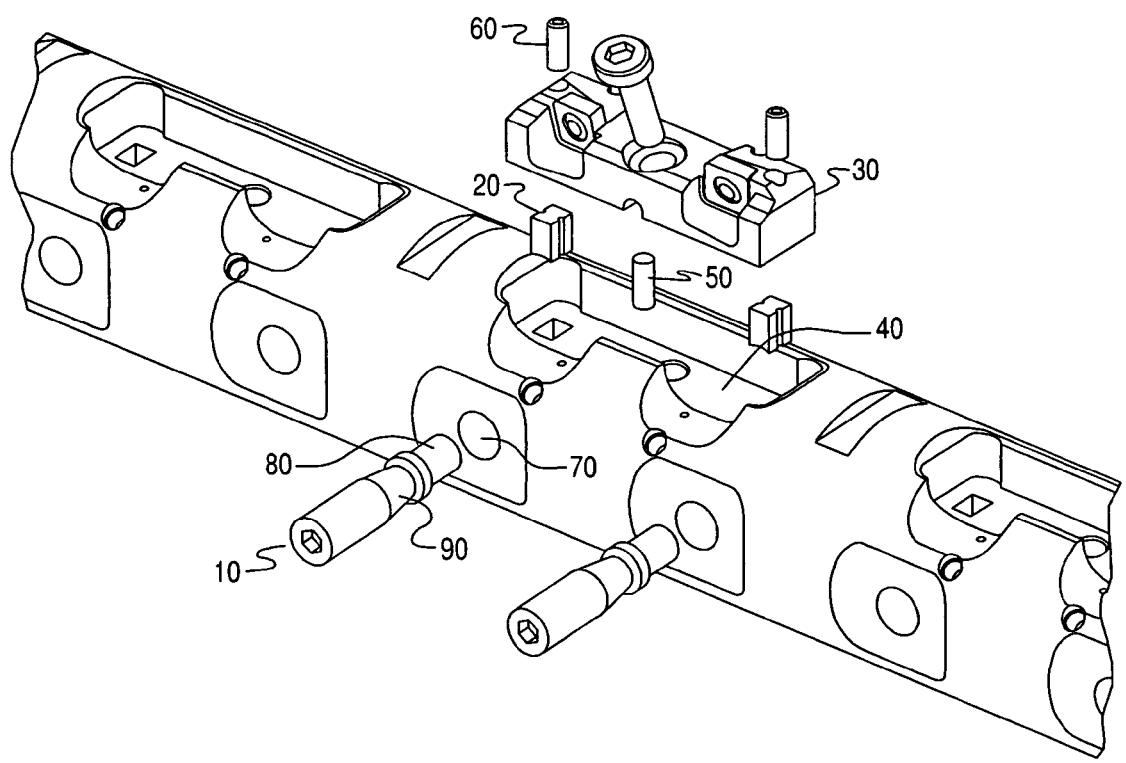
FIG. 1 shows a conventional arrangement for a prior art eccentric adjustment system.
Figure 2:
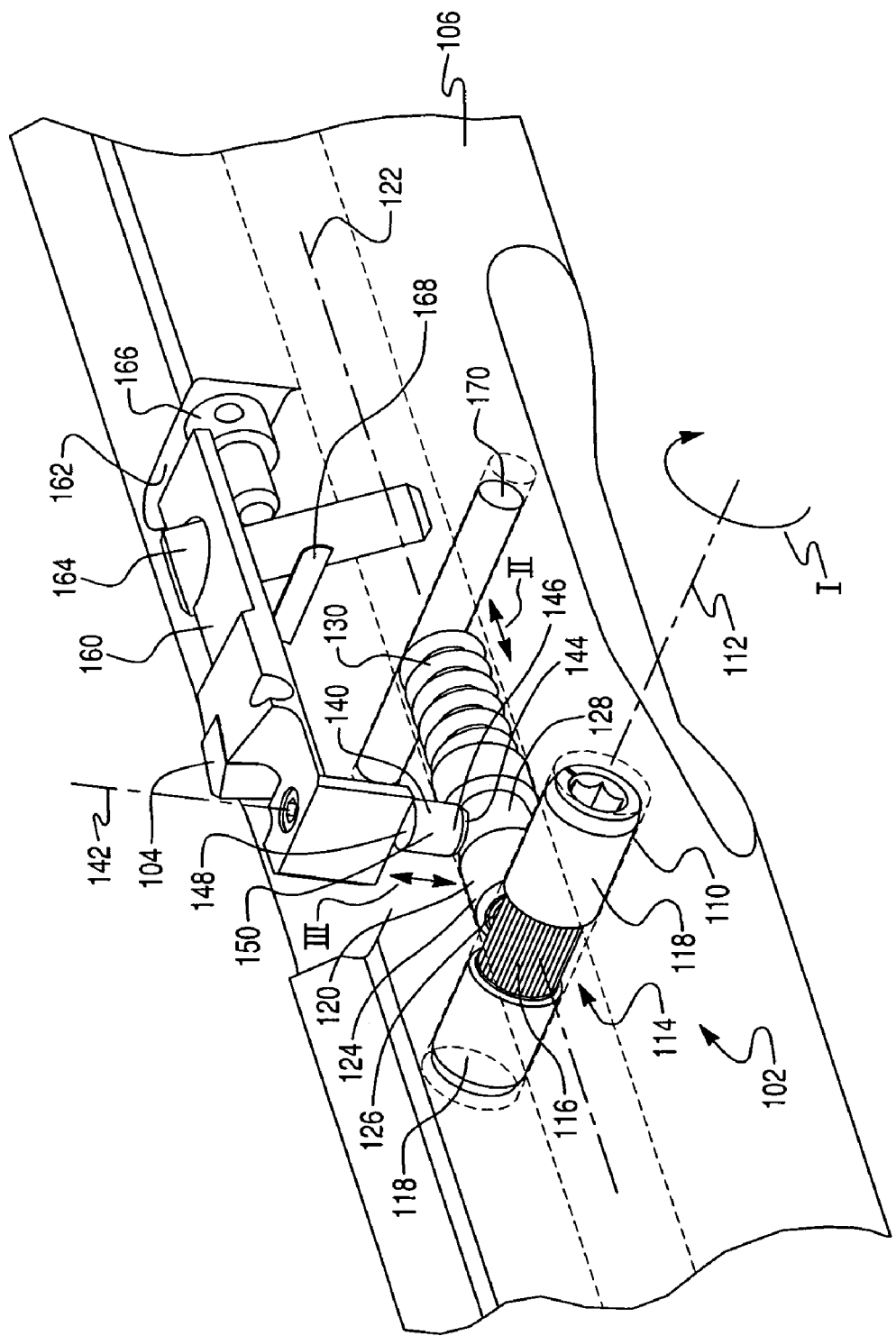
FIG. 2 is an isometric view of an exemplary embodiment of an adjustment system for positioning a cutting insert on a cutting tool.

An adjustment system for positioning a cutting insert on a cutting tool has a rotatable first rod with a surface having a plurality of flatted areas arranged radially, each at a different radial distance from an axial center of the first rod relative to a sequentially adjacent flatted area, a translatable second rod with an axially tapered surface, wherein a face of the first end of the second rod contacts one of the plurality of flatted areas, a biasing element positioned to exert a force to bias the face of the first end of the second rod to contact the flatted area, and a translatable push pin, wherein a face of the first end of the push pin contacts the tapered surface and wherein a face of the second end of the push pin operatively contacts a cartridge mounted on the cutting tool and in which the cutting insert is seated. A tool incorporating the adjustment system, a method of radially positioning a cutting surface of a cutting insert on a cutting tool, and a method of adjusting a radial position of a cutting surface of a cutting insert on a cutting tool are also disclosed FIG. 2 is an isometric view of an exemplary embodiment 100 of an adjustment system 102 for positioning a cutting insert 104 on a cutting tool 106. In the FIG. 2 view, the adjustment system 102 is shown positioned within the cutting tool 106, which is shown in shadow to allow the internal arrangement of the adjustment system 102 to be visible.

The adjustment system 102 comprises a first rod 110, a second rod 120, a biasing element 130, and a push pin 140. Additional features shown in FIG. 2 include a cartridge 160 in which the cutting insert 104 is seated and a stop rod 170.

The first rod 110 is rotatable (I) about a first axis 112, which is oriented in a first direction. The first rod 110 includes a surface 114 having a plurality of flatted areas 116 arranged radially to the first axis 112. Each of the plurality of flatted areas 116 is at a different radial distance from an axial center of the first rod 110 relative to a sequentially adjacent flatted area.

The second rod 120 is translatable (II) along a second axis 122 oriented in a second direction. A first end 124 of the second rod 120 has a face 126 that contacts one of the plurality of flatted areas 116. The face 126 can optionally be formed of a hardened material to provide wear resistance to the face 126. An example of a hardened material is cemented carbide, which may be incorporated in to the second rod 120 as an inserted surface or as a joined surfaced, e.g., brazed or soldered. A surface 128 of the second rod 120 is tapered in the axial direction. That is, the surface 128 of the second rod 120, or at least a portion thereof, is angled with respect to the second axis 122. Typically, the second axis is perpendicular or substantially perpendicular (±10 degrees) to the first axis 112, but other orientations can also be used. In operation, as the first rod 110 is rotated to place a different flatted area 116 in contact with the face 126 of the second rod 120, the second rod 120 translates a corresponding distance along the second axis 122.

The biasing element 130 is positioned to exert a force to bias the face 126 of the first end 124 of the second rod 120 to contact the one of the plurality of flatted areas 116. Examples of biasing elements include mechanical systems, such as springs, dashpots, elastic materials, and non-mechanical systems, such as compressible fluids and compressible gases. Biasing can be accomplished by any desired technique. For example, a mechanical biasing element, such as the spring shown in FIG. 2, can be used. In exemplary embodiments, the biasing element is preloaded to exert the force to bias the face of the first end of the second rod to contact the one of the plurality of flatted areas.

The push pin 140 is translatable (III) along a third axis 142 oriented in a third direction. A face 144 of the first end 146 of the push pin 140 contacts the tapered surface 128 of the second rod 120. Also, a face 148 of the second end 150 of the push pin 140 operatively contacts the cartridge 160 mounted on the cutting tool 106 and in which the cutting insert 104 is seated.

Additional elements can optionally be included with the adjustment system 100 when the adjustment system is included in a cutting tool. For example, a cartridge for one or more cutting inserts, such as a cartridge 160, can be mounted in a slot 162 of the tool body. The cartridge has one or more cutting inserts mounted thereon and the cartridge is mounted with cutting surfaces of the cutting inserts projecting beyond a volume of the tool body. The cartridge is mounted by any suitable means, such as by the cap screw 164 depicted in FIG. 2. Further, the cartridge includes an axial locating device, such as a locating screw 166, which can be adjusted to change an axial position of the cartridge in the slot 162.

The cartridge can be mounted to obtain a desired flexing of the cartridge under operation of the adjustment system. For example, in some embodiments, the cartridge includes a flex slot 168. The flex slot 168 is on a surface of the cartridge facing toward a surface of the slot 162. When the flex slot separates the mounting mechanism, such as the cap screw, from the point of contact of the adjustment system, such as the operative contact of the second end of the push pin with the cartridge, and the insert, then the cartridge flexes radially more easily at the end with the insert.

The position of the insert relative to the flex slot, the mounting mechanism, and the point of contact of the adjustment system provides additional variable that can be adjusted by a tool designer to influence the adjustability of the insert. For example, if the insert is axially located between the axial position of the cap screw and the axial position of the push pin, then the insert will translate a radial distance that is less than the translated distance of the push pin. Such a translation can be determined and considered. An example, is an axial position of the insert that is at a distance from the axial position of the cap screw that is 75% of the separation distance from the axial position of the cap screw to the axial position of the push pin.

Further, the return force of the cartridge arising from the flexing exerts a reverse force through the push pin on the tapered surface to provide additional bias for the second pin to contact the flatted areas. This reverse force also provides an increased tactile feedback to the user rotating the first rod.

Figure 3:
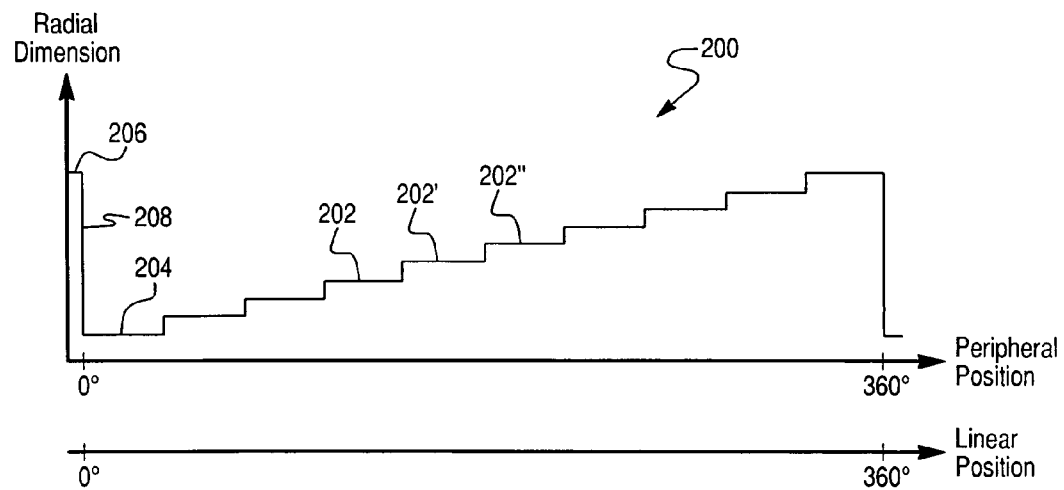
FIG. 3 shows a stepped height profile associated with the surface having a plurality of flatted areas.

As previously noted, each of the plurality of flatted areas 116 is at a different radial distance from an axial center of the first rod 110 relative to a sequentially adjacent flatted area. For example and for illustration purposes, if the surface profile of the surface 114 having a plurality of flatted areas 116 is extended linearly, as opposed to the peripheral arrangement about the first rod, then a stepped height profile 200, such as shown in FIG. 3, is observed. In the FIG. 3 representation, the stepped height profile 200 includes sequential flatted areas 202, 202', 202", each representing a desired height difference, e.g., a change in the radial dimension. Examples of height differences include 2 to 10 thousandths of an inch (approximately 50-250 µm), alternatively 2-4 thousandths of an inch (50-100 µm). In the case where the sequentially flatted areas generally increase or decrease in height as the peripheral or linear position changes, a rotation, such as a counterclockwise rotation, of the first rod 110 toward 0° places a flatted area of reduced height 204 next to a flatted area of increased height 206, the difference in radial dimension larger than the general gradation in radial dimension between sequential flatted areas 202, 202', 202". In such a case, the difference in radial dimension 208 forms a stop for the rotatable first rod. This stop can, in some embodiments, be correlated to a zeroing for the adjustment system and can be used as a reference for adjustments. Although FIG. 3 illustrates that each of the plurality of flatted areas is at a different radial dimension relative to a sequentially adjacent flatted area and that there is an increasing/decreasing radial dimension as a function of peripheral position, it will be appreciated that other arrangements can be used, such as a stepped pyramid, an alternating increasing/decreasing radial dimension, and a repeating sequence of changes in the radial dimension.

The flatted areas may extend the complete axial length of the first rod, or a portion of the axial extent. In the first rod 110 shown in FIG. 2, the plurality of flatted areas 116 extend over a centered portion of the axial extent with a portion of larger radial dimension 118 to both sides, e.g., the portions of larger radial dimension separate the flatted areas from each of the ends of the first rod or bound the flatted areas. However, the plurality of flatted areas can be at any portion of the first rod and are not restricted to either the center portion or to being bound by portions of larger radial dimension. Also, the radially arranged flatted areas, at least at a portion contacting the second rod, are each at a constant radial position along an axial length of the respective flatted surface.

Figure 4:
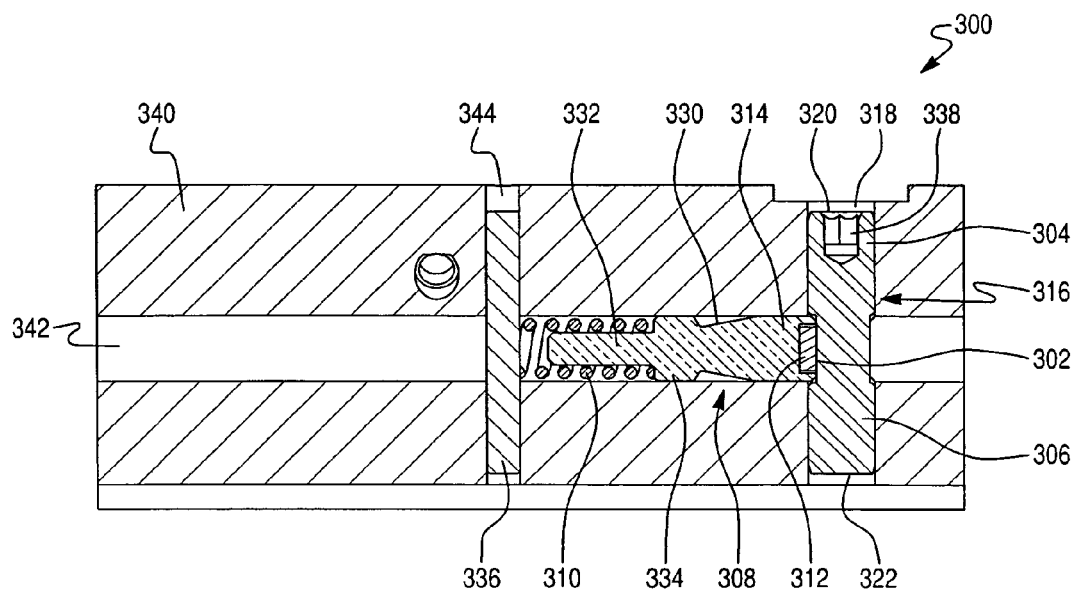
FIG. 4 is a top axial cross-sectional view of an exemplary embodiment of an adjustment system for positioning a cutting insert on a cutting tool.

FIG. 4 is a top, axial cross-sectional view of an exemplary embodiment of an adjustment system 300 for positioning a cutting insert on a cutting tool. In the embodiment shown in FIG. 4, the plurality of flatted areas 302 are bound on either side by a portion of larger radial dimension 304, 306. The biasing of the second rod 308, by, for example, the biasing element 310, places a face 312 of the first end 314 of the second rod 308 in contact with the flatted areas 302. Further, because of the difference in radial dimension between the flatted areas 302 and the portions on either side 304, 306, the second rod also contributes to secure the first rod 316 in its channel 318.

In addition, the ends 320, 322 of the first rod 316 and the transition areas between the radial dimension of the flatted areas 302 and the portions on either side 304, 306 are chamfered or otherwise angled. The chamfering facilitates the sliding of surfaces of the first rod 316 past the face 312 of the second rod 308 during installation, removal and/or replacement of the first rod 316.

An example of a method to replace the first rod 318 includes axially aligning a replacement first rod with an installed first rod and applying pressure on the replacement first rod, such as by manual forces, mechanical forces, a hammer and so forth. Under the applied pressure, the installed first rod exits one end of the channel. The chamfers on both the installed first rod and replacement first rod facilitated the sliding of the surfaces past the face of the second rod during this process. As the replacement first rod is tapped into position, it clicks into place and is held there by the biasing force acting on the tapered pin. Once properly located, the biasing of the second rod into the flatted areas secures the replacement rod in place in the channel.

Additional features associated with exemplary embodiments of the adjustment system are illustrated in FIG. 4. For example, the tapered surfaces 330 of the second rod 308 are shown. In another example, the positioning of the biasing element 310, in the form of a spring, coaxially about a second end 332 of the second rod 308 is shown. A first end of the spring contacts a stop 334 on the second rod 308 and a second end of the spring contacts the stop rod 336. The second end 332 can be spaced away from the surface of the stop rod 336 or, the second end 332 of the second rod 308 can contact a surface of the stop rod 336. Separation between the second end 332 and the surface of the stop rod 336 provides space for translation of the second rod 308 during operation of the adjustment system. The biasing element 310 contributes to maintaining the separation distance by biasing the face 312 of the second rod 308 toward the flatted areas 302. The stop rod 336 is optional and can be replaced by any feature that provides a surface for the biasing element, although a stop rod contributes to ease of manufacture and replacement. In further example, an interface 338, such as a hex head, can be included with the first rod 316 for rotating the first rod 316.

The channels in the tool body 340 for some of the components of the adjustment system are also seen in FIG. 4. The channel 318 of the first rod 316 is arranged substantially (±10°) perpendicular to the channel 342 for the second rod 308. The channel 344 for the stop rod 336 is arranged substantially (±10°) perpendicular to the channel 342 for the second rod 308. The channel 342 for the second rod 308 has a first end that at least partially intersects the channel 318 for the first rod 316 and has a second end that at least partially intersects the channel 344 for the stop rod 336. Various manufacturing techniques can be used to form the channels. In one example and for ease of manufacture and assembly, the channel 342 for the second rod 308 can run the axial length of the tool body 340 and can be formed by drilling, albeit with a suitable finish to allow movement of the parts of the adjustment system. The other channels can be drilled or reamed. In the case of the first rod 316, the operation with the second rod 308 maintains the first rod's position in the tool body. In the case of the stop rod 336, the stop rod can be pressed fit or can be a knurled pin.

The channels are advantageously located dispersed in the tool body. For example, the channel for the first rod is axially offset from the location of the cartridge and the slot. This results in less bending of the tool, stronger cross-sections, reduced cracking of the tool body and overall increased tool life. This is at least partially due to the multiple channels and slot not being in the same cross-section. In addition, the channels can be circular in cross-section, or substantially circular, thereby reducing stresses that can occur from squared geometries. Further, the channels can be positioned sufficiently close about a neutral axis of bending of the machining tool so as to maximize the resistance to bending. For example, the channel of the second rod is at a location of neutral compressive or tensile stresses. Similarly, cross-channels such as the channels for the first rod, for the stop rod and for the push pin, are at a location of neutral compressive or tensile stresses created by the cutting forces.

Figure 5:
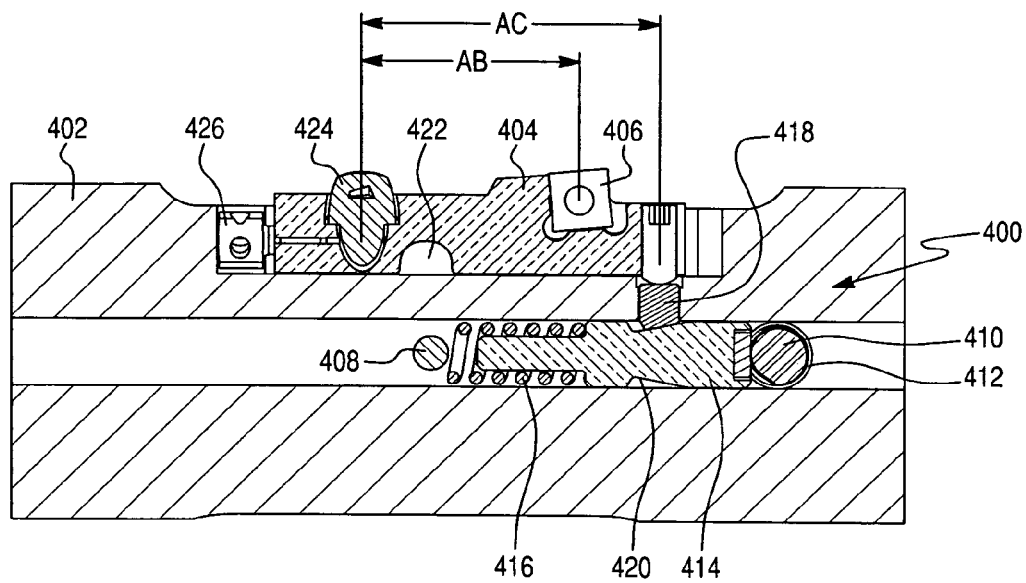
FIG. 5 is a side axial cross-sectional view of an exemplary embodiment of an adjustment system for positioning a cutting insert on a cutting tool.

FIG. 5 is a side axial cross-sectional view of an exemplary embodiment of an adjustment system for positioning a cutting insert on a cutting tool. In general, the FIG. 5 view illustrates the arrangement of the adjustment system 400 in the tool body 402 and its relationship to the cartridge 404 for the cutting insert 406 and the stop rod 408. The adjustment system 400 includes the first rod 410 with the flatted areas 412, the second rod 414, the biasing element 416 for the second rod 414 and the push pin 418 in contact with the tapered surface 420 and operatively contacting the cartridge 404. Also illustrated are the flex slot 422, the mounting screw 424 and the locating screw 426 for the cartridge 404.

Figure 6:
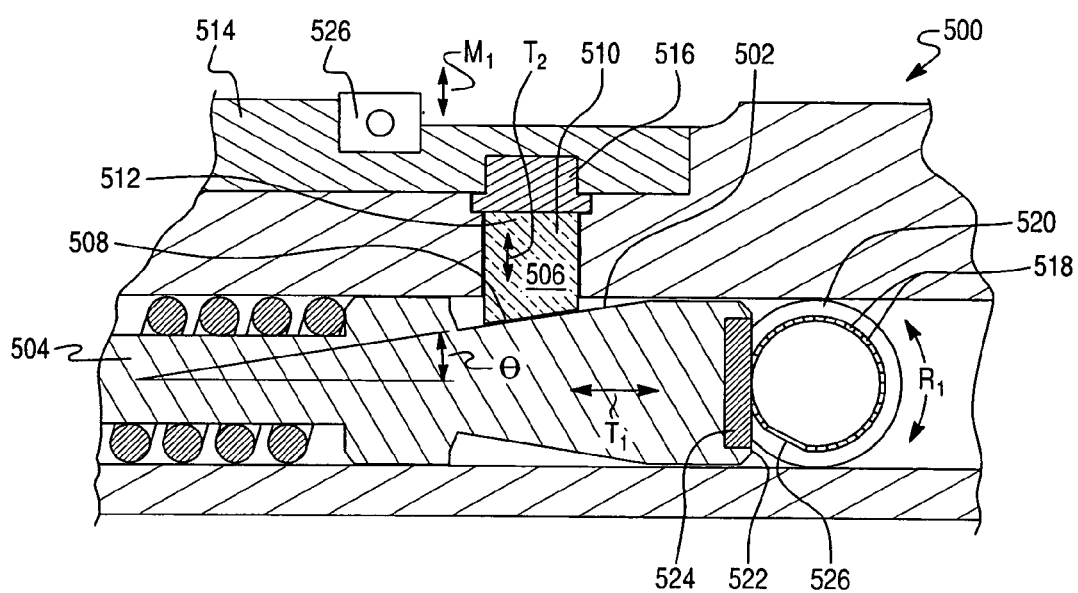
FIG. 6 is a magnified view of the FIG. 5 showing the exemplary embodiment of an adjustment system for positioning a cutting insert on a cutting tool.

FIG. 6 is a magnified view of the FIG. 5 showing the exemplary embodiment of an adjustment system 500 for positioning a cutting insert on a cutting tool. In the FIG. 6 view, the tapered surfaces 502 of the second rod 504 and the contact between the tapered surfaces 502 and the push pin 506 are more clearly shown. For example, the face 508 of the first end 510 of the push pin 506 has an angled surface that correlates to the tapered surface 502 of the second rod 504. As the second rod 504 translates ($T_1$), the face 508 maintains line contact with an axially extending length of the tapered surface 502 of the second rod 504 and the push pin 506 translates ($T_2$).

The second end 512 of the push pin 506 operatively contacts the cartridge 514, either directly or, as shown in FIG. 6, through an intermediate structure such as a contact pin 516.

In the FIG. 6 view, the contact between the second rod 504 and the flatted areas 518 of the first rod 520 are also more clearly shown. For example, the flatted areas 518 are rotatable ($R_1$) to variously contact the face 522 of the second rod 504, which can be a hardened material 524. The flatted areas 518 have differing radial dimension and, as previously discussed in reference to FIG. 3, produce a stop 526. In operation, rotation ($R_1$) of the first rod changes the flatted area contacting the face 522 of the second rod and translate ($T_1$) the second rod; translation of the tapered surfaces 502 causes translation ($T_2$) of the push pin 506 and movement ($M_1$) of the cartridge 514 and the cutting insert 526. An example of the translation of the push pin ($T_2$) is gradations of 2 to 4 microns and to a maximum distance of about 80 microns.

Figure 7:
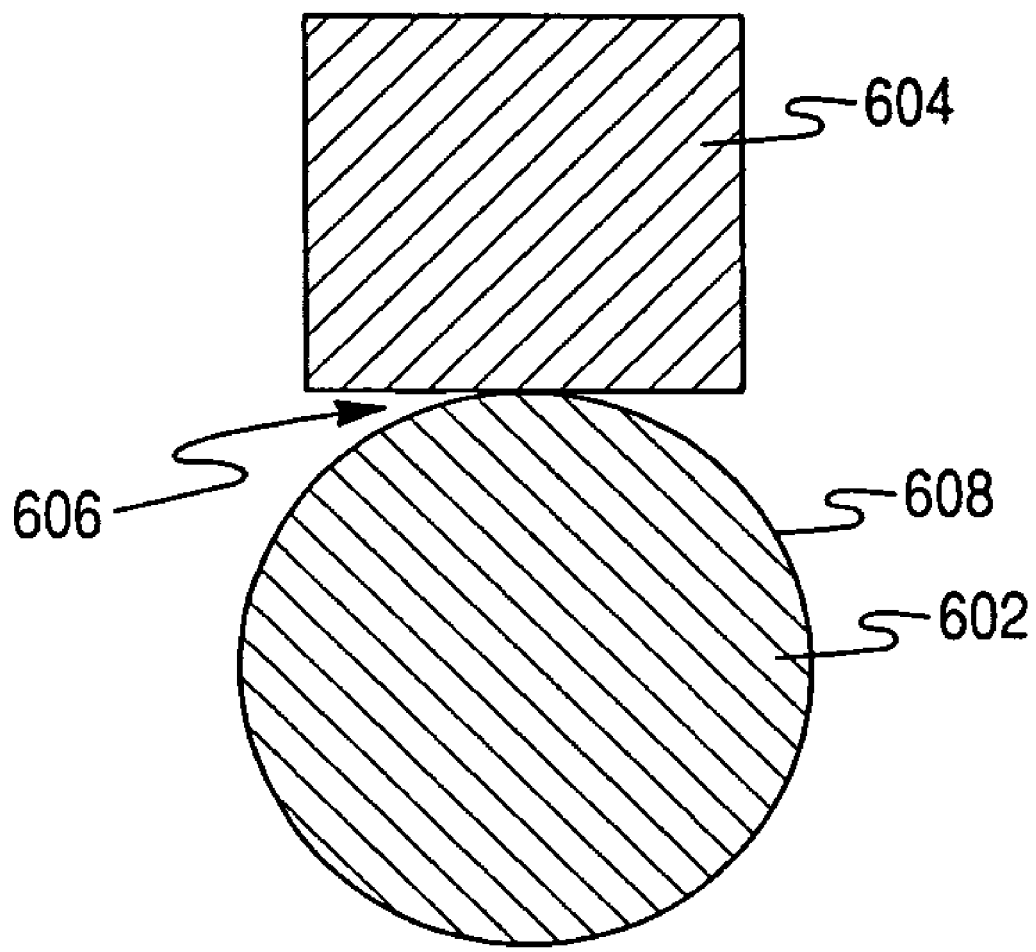
FIG. 7 is a cross-sectional radial view of an exemplary embodiment of an adjustment system.

FIG. 7 is a cross-sectional radial view of an exemplary embodiment of an adjustment system. In the FIG. 7 view, the contact between the second rod 602 and the push pin 604 is illustrated. In radial cross-section of the cutting tool, the push pin 604 is not tapered, but rather is square and horizontal, making tangential contact 606 to a radially extending periphery 608 of the tapered surface of the second rod 602. A tangential contact as seen in FIG. 7 allows for less precision in the machining of the channels for the push pin and the second rod.

As described herein, the second rod has a tapered surface that translates a distance correlated to the change in height of the flatted areas as the first rod is rotated, and by which the push pin translates and operates to change the radial position of the cutting insert. The tapered surface reduces the amount of adjustment provided by manipulation of the flatted areas alone, allowing for very fine adjustment of the cutting surfaces of the cutting insert. The amount of change to the radial position of the cutting insert as a result of the tapered surface can be calculated and/or calibrated to the amount of rotation of the first rod. For example, the following formula applies:

$$R = x \tan(\theta)$$

where x is the change in height of the flatted areas and $\theta$ is the angle of the tapered surface (refer to FIG. 6 for an illustration of angle $\theta$).

The location of the insert relative to the cap screw that mounts the cartridge and the operative contact point of the push pin on the cartridge also provides an additional fine adjustment of the cutting surfaces over manipulation of the flatted areas alone. Adding this refinement in adjustment to the above equation, one can develop the following relationship:

$$R = x \tan(\theta) \times (\text{ratio}_1)$$

where x is the change in height of the flatted areas, $\theta$ is the angle of the tapered surface, and $\text{ratio}_1$ is the ratio of the axial distance of the insert from the cap screw to the axial distance of the contact point from the mounting point. the distance from the axial position of the set crew to the axial position of the center of the cutting surfaces of the cutting insert ($\overline{AB}$ in FIG. 5) to the distance from the axial position of the cap screw to the axial position of the center of the push pin ($\overline{AC}$ in FIG. 5). Thus:

$$R = x \tan(\theta) \times \left( \frac{\overline{AB}}{\overline{AC}} \right)$$

The adjustment system adjusts linearly. A fixed rotation of the input, at any point in the operational range of the system, produces the same final net translation. For example, a rotation of X° will have the same final net translation of Y μm. In contrast, eccentric systems operate non-linearly.

Examples of lengths and operating distances of exemplary embodiments include: (a) the push pin translatable along the third axis in gradations of 2 to 6 microns and to a maximum distance of about 80 microns; (b) the height difference or change in radial dimension between successive flatted areas of 1 to 5 thousandths of an inch (approximately 25-125 μm), alternatively 2-4 thousandths of an inch (50-100 μm); and (c) the tapered surface of the second rod at an angle of 5 to 15 degrees to the second axis, alternatively 9-12 degrees, alternatively about 11 degrees.

The adjustment system disclosed herein can be used to radially position a cutting surface of a cutting insert on a cutting tool. For example, an exemplary method of radially positioning a cutting surface of a cutting insert on a cutting tool comprises adjusting an adjustment system for the cutting insert, wherein the adjustment system includes a first rod rotatable about a first axis, the first axis oriented in a first direction, wherein the first rod includes a surface having a plurality of flatted areas arranged radially to the first axis and wherein each of the plurality of flatted areas is at a different radial distance from an axial center of the first rod relative to a sequentially adjacent flatted area, a second rod translatable along a second axis oriented in a second direction, wherein a first end of the second rod has a face that contacts one of the plurality of flatted areas and wherein a surface of the second rod is tapered in the axial direction, a biasing element positioned to exert a force to bias the face of the first end of the second rod to contact the one of the plurality of flatted areas, and a push pin translatable along a third axis oriented in a third direction, wherein a face of the first end of the push pin contacts the tapered surface of the second rod and wherein a face of the second end of the push pin operatively contacts a cartridge mounted on the cutting tool and in which the cutting insert is seated. Adjusting the adjustment system changes the flatted surface contacting the face at the first end of the second rod. Further, adjusting the adjustment system changes the portion of the tapered surface of the second rod which contacts the push pin. The result of the push pin translation is the radial translation of the cartridge and associated cutting surfaces of the cutting insert mounted therein.

Another exemplary method of adjusting a radial position of a cutting surface of a cutting insert on a cutting tool comprises operating a first rod to place one of a plurality of flatted areas arranged radially to a first axis in contact with a face at a first end of a second rod, wherein the first rod is rotatable about the first axis oriented in a first direction, wherein the second rod is translatable along a second axis oriented in a second direction and wherein a surface of the second rod is tapered in the axial direction, and translating the second rod in the second direction to change a portion of the tapered surface contacting a face of a first end of a push pin. As the portion of the tapered surface contacting a face of a first end of a push pin changes, the push pin translates along a third axis in a third direction. The face of a second end of the push pin then operatively contacts a cartridge mounted on the cutting tool and in which the cutting insert is seated. In some embodiments, translating the push pin along the third axis flexes the cartridge. Further, the method optionally biases the second pin to contact the face at the first end to the flatted areas.

Exemplary embodiments of the disclosed adjustment system and method of adjusting provide a feedback to an operator indicating adjustment of the radial position of the cutting surface. For example, the feedback can be correlated to each change of the flatted area. As the flatted area in contact with the second rod changes, the biasing forces of the adjustment system, both from the biasing element and translated through the push pin, are available to the user through tactile senses. Also, the ratcheting or clicking of the face of the second rod contacting the changing flatted areas are available to the user through audible senses. Either or both of these feedback mechanisms can be used.

No gauges are necessary. Advantageously, it is not necessary to read a graduated surface to determine adjustment where light may not be good, reach into a machining tool may be limited, or graduated surfaces can be dirty. Operators can make very fine adjustments with a normal shop tool.

The method of manufacturing is simplified, making the product more cost effective. Also, the wear parts, such as the first rod with the flatted areas, can be replaced without disassembling the tool.

Although described in connection with preferred embodiments thereof, it will be appreciated by those skilled in the art that additions, deletions, modifications, and substitutions not specifically described may be made without departure from the spirit and scope of the invention as defined in the appended claims.

What is claimed is:

1. An adjustment system for positioning a cutting insert on a cutting tool, the adjustment system comprising:
   a first rod rotatable about a first axis, the first axis oriented in a first direction, wherein the first rod includes a surface having a plurality of flatted areas arranged radially to the first axis and wherein each of the plurality of flatted areas is at a different radial distance from an axial center of the first rod relative to a sequentially adjacent flatted area;
   a second rod translatable along a second axis oriented in a second direction, wherein a first end of the second rod has a face that contacts one of the plurality of flatted areas and wherein a surface of the second rod is tapered in the axial direction;
   a biasing element positioned to exert a force to bias the face of the first end of the second rod to contact the one of the plurality of flatted areas; and
   a push pin translatable along a third axis oriented in a third direction, wherein a face of the first end of the push pin contacts the tapered surface of the second rod and wherein a face of the second end of the push pin operatively contacts a cartridge mounted on the cutting tool and in which the cutting insert is seated.

2. The adjustment system of claim 1, wherein the radially arranged flatted areas have a stepped arrangement around a periphery of the first rod.

3. The adjustment system of claim 2, wherein a height difference between a flatted area of reduced height and a sequentially adjacent flatted area of increased height forms a stop for the rotatable first rod.

4. The adjustment system of claim 3, wherein the stop correlates to a zeroing for the adjustment system.

5. The adjustment system of claim 1, wherein the face of the first end of the second rod includes a cemented carbide surface, the cemented carbide surface contacting the one of the plurality of flatted areas.

6. The adjustment system of claim 1, wherein the face of the first end of the push pin has an angled surface that correlates to the tapered surface of the second rod.

7. The adjustment system of claim 1, wherein the face of the first end of the push pin makes line contact with an axially extending length of the tapered surface of the second rod.

8. The adjustment system of claim 7, wherein the face of the first end of the push pin makes tangential contact to a radially extending periphery of the tapered surface of the second rod.

9. The adjustment system of claim 1, wherein the biasing element is a spring and wherein the spring is coaxially arranged about a second end of the second rod with a first end of the spring contacting a stop on the second rod and a second end of the spring contacting the stop rod.

10. A cutting tool, comprising:
a tool body;
a cartridge for one or more cutting inserts, the cartridge mountable in a slot of the tool body with a cutting surface of the one or more cutting inserts projecting beyond a volume of the tool body; and
an adjustment system for positioning the cutting insert in a radial direction, the adjustment system including:
a first rod located in a first channel of the tool body, the first rod rotatable in the first channel about a first axis, the first axis oriented in a first direction, wherein the first rod includes a surface having a plurality of flatted areas arranged radially to the first axis and wherein each of the plurality of flatted areas is at a different radial distance from an axial center of the first rod relative to a sequentially adjacent flatted area,
a second rod located in a second channel of the tool body, a first end of the second channel at least partially intersecting the first channel, the second rod translatable in the second channel along a second axis oriented in a second direction, wherein a first end of the second rod has a face that contacts one of the plurality of flatted areas and wherein a surface of the second rod is tapered in the axial direction,
a biasing element located within the interior of the tool body to exert a force to bias the face of the first end of the second rod to contact the one of the plurality of flatted areas, and
a push pin located in a third channel of the tool body, a first end of the third channel at least partially intersecting the second channel and a second end of the third channel at least partially intersecting the slot, the push pin translatable in the third channel along a third axis oriented in a third direction, wherein a face of the first end of the push pin contacts the tapered surface of the second rod and wherein a face of the second end of the push pin operatively contacts the mounted cartridge.

11. The cutting tool of claim 10, wherein the cartridge includes a flex slot on a surface of the cartridge facing toward a surface of the slot, wherein the cartridge is mounted by a cap screw and wherein the cap screw is separated from the operative contact point of the face of the second end of the push pin with the mounted cartridge push pin by the flex slot.

12. The cutting tool of claim 11, wherein the cutting surface of at least one cutting insert is axially located between the axial position of the cap screw and the axial position of the push pin.

13. The cutting tool of claim 12, wherein the radially arranged flatted areas have a stepped arrangement around a periphery of the first rod, a height difference between successive flatted areas increasing by 1 to 10 thousandths of an inch, wherein the tapered surface of the second rod is at an angle of 5 to 15 degrees to the second axis, and wherein a distance from the axial position of the cap screw to the axial location of the cutting surface is about 75% of a separation distance from the axial position of the cap screw to the axial position of the push pin.

14. The cutting tool of claim 10, wherein the radially arranged flatted areas have a stepped arrangement around a periphery of the first rod.

15. The cutting tool of claim 10, wherein a height difference between a flatted area of reduced height and a sequentially adjacent flatted area of increased height forms a stop for the rotatable first rod.

16. The cutting tool of claim 15, wherein the stop correlates to a zeroing for the adjustment system.

17. The cutting tool of claim 10, wherein the face of the first end of the second rod includes a cemented carbide surface, the cemented carbide surface contacting the one of the plurality of flatted areas.

18. The cutting tool of claim 10, wherein the face of the first end of the push pin has an angled surface that correlates to the tapered surface of the second rod.

19. The cutting tool of claim 10, wherein the face of the first end of the push pin makes line contact with an axially extending length of the tapered surface of the second rod.

20. The cutting tool of claim 19, wherein the face of the first end of the push pin makes tangential contact to a radially extending periphery of the tapered surface of the second rod.

21. The cutting tool of claim 10, comprising a stop rod located in a fourth channel of the tool body, a second end of the second channel at least partially intersecting the fourth channel.

22. The cutting tool of claim 21, wherein the biasing element is a spring and wherein the spring is coaxially arranged about the second end of the second rod with a first end of the spring contacting a stop on the second rod and a second end of the spring contacting the stop rod.

23. A method of radially positioning a cutting surface of a cutting insert on a cutting tool, the method comprising:
adjusting an adjustment system for the cutting insert, wherein the adjustment system includes
a first rod rotatable about a first axis, the first axis oriented in a first direction, wherein the first rod includes a surface having a plurality of flatted areas arranged radially to the first axis and wherein each of the plurality of flatted areas is at a different radial distance from an axial center of the first rod relative to a sequentially adjacent flatted area,
a second rod translatable along a second axis oriented in a second direction, wherein a first end of the second rod has a face that contacts one of the plurality of flatted areas and wherein a surface of the second rod is tapered in the axial direction,
a biasing element positioned to exert a force to bias the face of the first end of the second rod to contact the one of the plurality of flatted areas, and
a push pin translatable along a third axis oriented in a third direction, wherein a face of the first end of the push pin contacts the tapered surface of the second rod and wherein a face of the second end of the push pin operatively contacts a cartridge mounted on the cutting tool and in which the cutting insert is seated, and
wherein adjusting the adjustment system changes the flatted surface contacting the face at the first end of the second rod.

24. The method of claim 23, wherein adjusting the adjustment system changes the portion of the tapered surface of the second rod which contacts the push pin.

25. A method of adjusting a radial position of a cutting surface of a cutting insert on a cutting tool, the method comprising:

operating a first rod to place one of a plurality of flatted areas arranged radially to a first axis in contact with a face at a first end of a second rod, wherein the first rod is rotatable about the first axis oriented in a first direction, wherein the second rod is translatable along a second axis oriented in a second direction and wherein a surface of the second rod is tapered in the axial direction;

translating the second rod in the second direction to change a portion of the tapered surface contacting a face of a first end of a push pin; and translating the push pin along a third axis oriented in a third direction, wherein a face of a second end of the push pin operatively contacts a cartridge mounted on the cutting tool and in which the cutting insert is seated.

26. The method of claim 25, wherein translating the push pin along the third axis flexes the cartridge.

27. The method of claim 25, comprising biasing the second pin to contact the face at the first end to the flatted areas.

28. The method of claim 27, wherein the method provides a feedback to an operator indicating adjustment of the radial position of the cutting surface.

29. The method of claim 28, wherein the feedback correlates to each change of the flatted surfaces.

30. The method of claim 28, wherein the feedback is tactile.

31. The method of claim 28, wherein the feedback is audible.

* * * * *